US007739232B2

(12) United States Patent
Ireland

(10) Patent No.: US 7,739,232 B2
(45) Date of Patent: Jun. 15, 2010

(54) PROGRAMMING SYSTEM FOR OCCASIONALLY-CONNECTED MOBILE BUSINESS APPLICATIONS

(75) Inventor: Evan Ireland, Wellington (NZ)

(73) Assignee: Sybase, Inc., Dublin, CA (US)

(*) Notice: Subject to any disclaimer, the term of this patent is extended or adjusted under 35 U.S.C. 154(b) by 336 days.

(21) Appl. No.: 11/882,448

(22) Filed: Aug. 1, 2007

(65) Prior Publication Data

US 2009/0037484 A1    Feb. 5, 2009

(51) Int. Cl.
*G06F 17/30* (2006.01)
(52) U.S. Cl. .................. 707/609; 707/610; 707/611
(58) Field of Classification Search ............. 707/3, 707/10, 104.1, 609, 610, 611
See application file for complete search history.

(56) References Cited

U.S. PATENT DOCUMENTS

| 6,539,381 | B1 | 3/2003 | Prasad et al. | |
|---|---|---|---|---|
| 6,567,864 | B1 * | 5/2003 | Klein | 710/10 |
| 6,636,873 | B1 * | 10/2003 | Carini et al. | 707/201 |
| 6,636,886 | B1 * | 10/2003 | Katiyar et al. | 709/203 |
| 6,769,032 | B1 * | 7/2004 | Katiyar et al. | 709/246 |
| 2004/0158577 | A1 * | 8/2004 | Chu et al. | 707/103 R |
| 2004/0193608 | A1 * | 9/2004 | Gollapudi et al. | 707/10 |
| 2005/0182773 | A1 | 8/2005 | Feinsmith | |
| 2007/0156656 | A1 * | 7/2007 | Pather et al. | 707/3 |

OTHER PUBLICATIONS

Leff et al., "Programming Model Alternatives for Disconnected Business Applications," IEEE Computer Society (IEEE Internet Computing), May-Jun. 2006; pp. 50-57.
Notification of Transmittal of the International Search Report and Written Opinion, dated Aug. 28, 2008, for PCT Application No. PCT/US08/07757, 10 pages.
Ireland et al., U.S. Appl. No. 11/882,447, filed Aug. 1, 2007, entitled "Persistent Query System For Automatic On-Demand Data Subscriptions From Mobile Devices".

* cited by examiner

*Primary Examiner*—Jean M Corrielus
(74) *Attorney, Agent, or Firm*—Sterne, Kessler, Goldstein & Fox PLLC

(57) ABSTRACT

A system, method, and computer program product are provided for synchronizing a local database with a remote database. Additionally, a system, method, and computer program product are provided for performing a service operation on a database, the database located on a database system.

7 Claims, 12 Drawing Sheets

PROGRAMMING SYSTEM FOR OCCASIONALLY-CONNECTED MOBILE BUSINESS APPLICATIONS

CROSS-REFERENCE TO RELATED APPLICATIONS

The present application is related to U.S. Patent Application titled "Persistent Query System for Automatic On-Demand Data Subscriptions from Mobile Devices," Ser. No. 11/882,447, filed Aug. 1, 2007, herein incorporated by reference in its entirety.

BACKGROUND OF INVENTION

1. Field of the Invention

The present invention relates generally to databases and, more particularly, to synchronizing a remote database with a local database.

2. Description of the Background Art

Mobile devices are in common usage, many featuring powerful processors, larger and more colorful displays, and wireless networking capabilities. Despite these advances in mobile technology, mobile devices typically have greater limitations on memory capacity and networkability than workstation computers. Given the versatility of mobile devices, it is helpful to implement a means by which these mobile devices can interact with data sets larger than any it could manage on its own, and doing so in the context of potentially intermittent, unreliable, or unavailable networking capabilities.

Interaction using data sets exchanged between mobile devices and central servers often occurs in the context of exchanges of information stored in databases. Mobile devices often retain a copy of some or all of the data found in the central database in a local database for local access. However, inefficiencies abound given the limitations of mobile devices. Additionally, mobile devices may run a variety of operating systems, software suites, and programming frameworks.

Accordingly, what is desired is a means of efficiently synchronizing a local database on a mobile device with a central database.

SUMMARY OF INVENTION

The invention includes a method for synchronizing a local database with a remote database. The method includes the steps of defining a service operation, wherein the service operation comprises a transaction, processing the transaction on the local database, capturing operation calls performed by the transaction, and capturing change sets of the transaction.

The invention also includes a computer program product comprising a computer usable medium having computer program logic recorded thereon for enabling a processor to synchronize a local database with a remote database. The computer program logic includes defining means for enabling a processor to define a service operation, wherein the service operation comprises a transaction, processing means for enabling a processor to process the transaction on the local database, first capturing means for enabling a processor to capture operation calls performed by the transaction, and second capturing means for enabling a processor to capture change sets of the transaction.

The invention additionally includes a system capable of synchronizing a local database with a remote database. The system includes a first module to define a service operation, wherein the service operation comprises a transaction, a second module to process the transaction on the local database, a third module to capture operation calls performed by the transaction, and a fourth module to capture change sets of the transaction.

The invention furthermore includes a method for performing a service operation on a database, the database located on a database system. The method includes the steps of defining a service operation, wherein the service operation comprises a transaction, determining a target environment for the database system, and processing the transaction on the database, wherein the transaction is selected from a set of transactions, the transaction corresponding to the target environment.

Moreover, the invention includes a computer program product comprising a computer usable medium having computer program logic recorded thereon for enabling a processor to perform a service operation on a database, the database located on a database system. The computer program logic includes defining means for enabling a processor to define a service operation, wherein the service operation comprises a transaction, determining means for enabling a processor to determine a target environment for the database system, and processing means for enabling a processor to process the transaction on the database, wherein the transaction is selected from a set of transactions, the transaction corresponding to the target environment.

Also included in the invention is a system capable of performing a service operation on a database, the database located on a database system. The system includes a first module to define a service operation, wherein the service operation comprises a transaction, a second module to determine a target environment for the database system, and a third module to process the transaction on the database, wherein the transaction is selected from a set of transactions, the transaction corresponding to the target environment.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the relevant art to make and use the invention.

Figure 1:
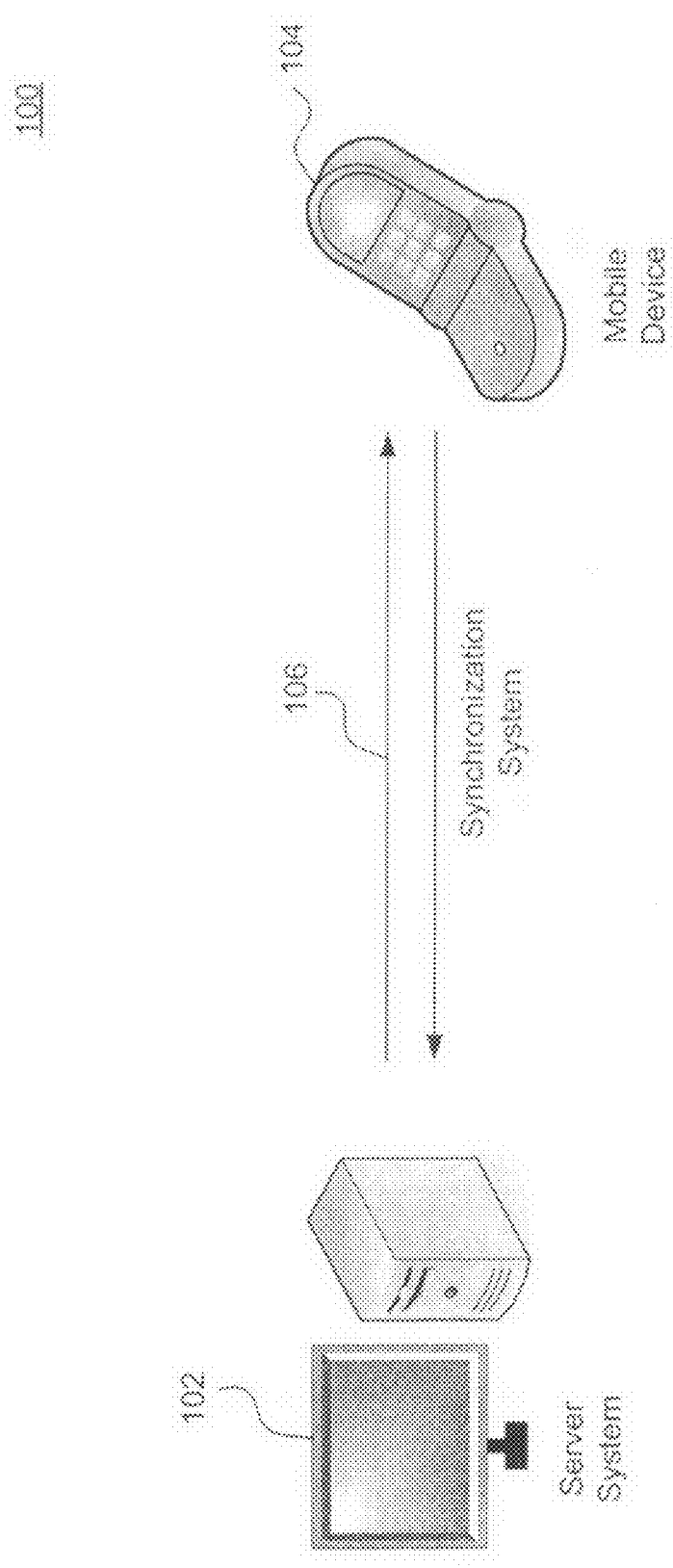
FIG. 1 illustrates a mobile data system, in accordance with an embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

FIG. 1 depicts a mobile system 100 which allows a mobile device 104 to synchronize with a server system 102 over a synchronization system 106, in accordance with an embodiment of the present invention. Synchronization allows mobile device 104 to receive the most current data available on server system 102, as well as upload its most currently available data to the server system 102, for any given application or set of applications. For example, a calendar application might allow other users to add or make changes to appointments which are then stored on server system 102. A user of mobile device 104 may also have added or made changes to appointments within the mobile device 104 itself. Upon synchronization, the server system 102 learns of the appointments made on mobile device 104, and mobile device 104 learns of appointments made on server system 102. In accordance with an additional embodiment of the present invention, a partial synchronization is possible, whereby some subset of appointments would be exchanged. "Data" as used herein may be any object, including, but not limited to, information in any form (text, video, audio, etc.) and applications.

Synchronization system 106 is commonly a persistent network connection over a cellular provider network, and communications travel over the Internet. However, synchronization system 106 may be any communication means by which server system 102 and mobile device 104 may interact, such as a docking cradle, Wide Area Network (WAN), Local Area Network (LAN), Wireless Local Area Network (WLAN), infrared, or Bluetooth. The degree of availability of access to the communication means employed may vary greatly, and a user of mobile device 104 may go for days without synchronizing by using a docking cradle, or may be able to synchronize constantly when connected to a WAN.

Figure 2:
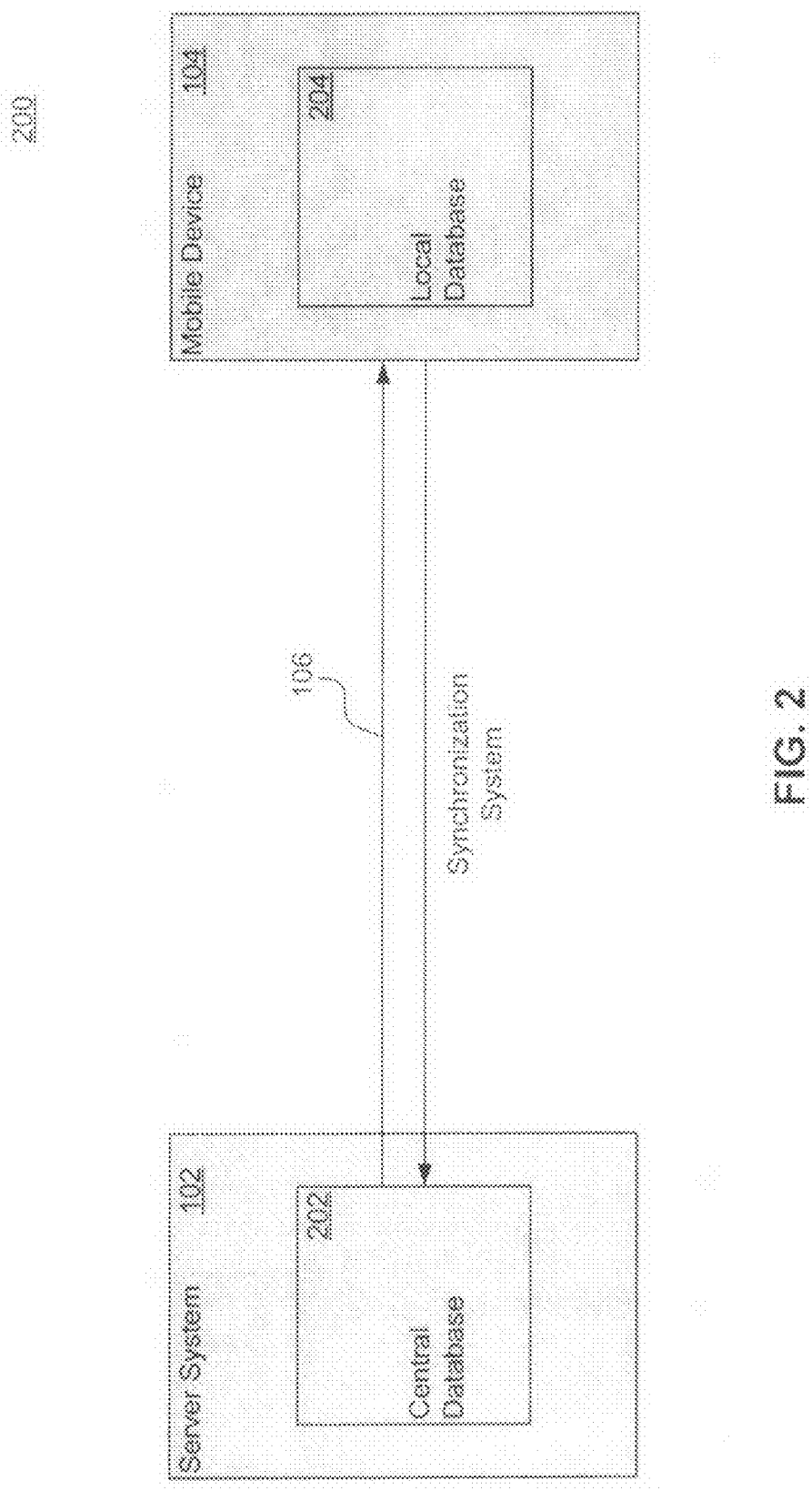
FIG. 2 illustrates a modular view of a mobile data system, in accordance with an embodiment of the present invention.

FIG. 2 depicts a mobile system 200 in which mobile device 104 is capable of synchronizing with server system 102 over synchronization system 106, in accordance with an embodiment of the present invention. Synchronization system 106 is operable to synchronize a central database 202 located at server system 102 with a local database 204 located at mobile device 104.

In a typical system, multiple mobile devices synchronize with a central server system. The central server system need not be a single physical computer, and may in fact comprise several computers distributed over a number of physical and network locations. For the purposes of illustration, a server system 102 is depicted as a single point of access for synchronization system 106.

Figure 3:
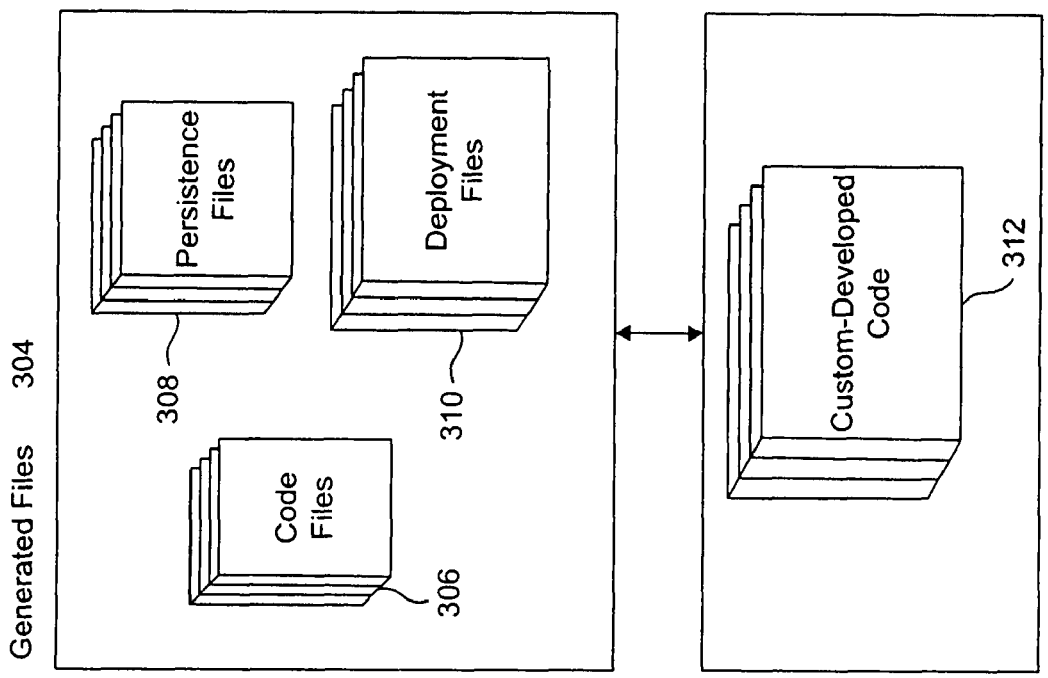
FIG. 3 illustrates a programming system, in accordance with an embodiment of the present invention.
Figure 3:
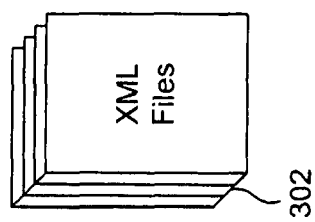

FIG. 3 depicts a programming system 300, in accordance with an embodiment of the present invention. A developer creates XML files 302 which are processed by a code generator to create generated files 304. These generated files include, for example, code files 306, persistence files 308, and deployment files 310. In accordance with an embodiment of the present invention, the developer creates custom-developed code 312, which is then combined with generated files 304. These generated files 304 form the basis of software running on mobile device 104 used to interact with local database 204 and synchronize with central database 202. The functionality of programming system 300 is described in greater detail in the following sections with continued reference to FIGS. 1-3.

II. Code Generation Process

Figure 4:
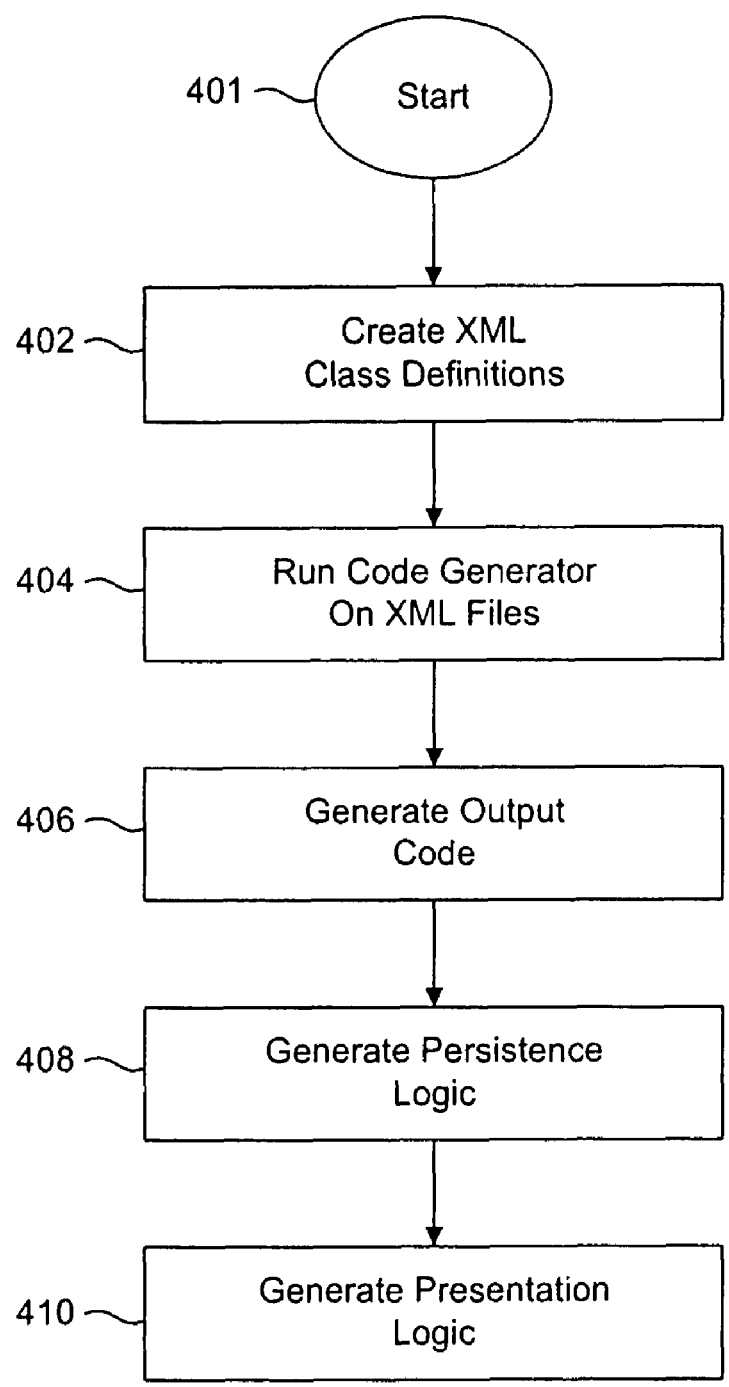
FIG. 4 is a flowchart illustrating steps by which code is generated, in accordance with an embodiment of the present invention.

FIG. 4 is a flowchart 400 which illustrates the steps by which programming system 300 is used to generate code for execution on mobile device 104. The method starts at step 401 and proceeds to step 402 where XML class definitions are created. At step 404, a code generator is run on the XML files. At step 406, output code is generated; persistence logic is generated at step 408; and presentation logic is generated at step 410.

In accordance with an embodiment of the present invention, a class definition includes parameter, attribute, and operation definitions. Parameters, attributes, and potentially other definition types optionally specify a data type. In accordance with an embodiment of the present invention, built-in data types are specified which have known equivalents in one or more target platforms (e.g., Java, C#). Accordingly, a basic class has the following structure, in accordance with an embodiment of the present invention:

```
<class name="MyClass">
    <parameter name="myParam" type="int" />
    <attribute name="x" type="int" />
    <attribute name="y" type="int" />
    <operation name="swap">
        <code>
            var t : int = x;
            x = y;
            y = t;
        </code>
    </operation>
</class>
```

One skilled in the relevant arts will appreciate that any schema may be used to achieve similar functionality, and the above schema is used only by way of example and not limitation.

At step 406, the code generator will produce output code based on the above example XML, in accordance with an embodiment of the present invention. For a target programming language, a class named "MyClass" is defined with an integer parameter "myParam" and integer attributes "x" and "y". The class also has an operation named "swap" defined, which takes the integer in "x", stores the integer in a temporary variable "t", copies the integer from "y" to "x", then copies the integer from "t" to "y". The content between the <code> tags appears in the body of the generated code in order to define the process by which the operation is performed.

Figure 5:
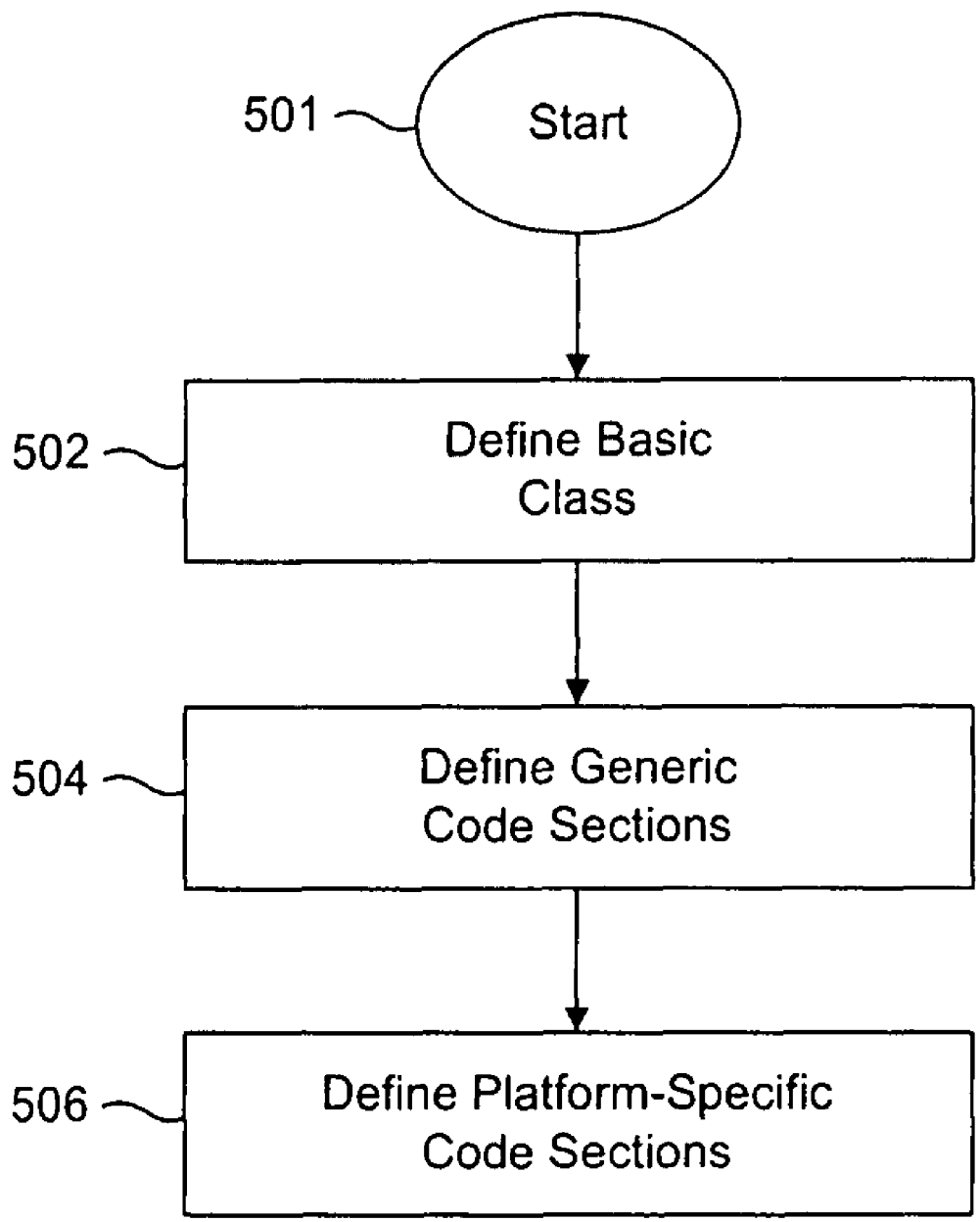
FIG. 5 is a flowchart illustrating steps by which portable application logic is written, in accordance with an embodiment of the present invention.

In the case of, for example, Java and C# programming, it is possible that a <code> section may be written such that the code is compatible with both programming languages. However, it may be necessary to define different code blocks for each language, either instead of or in addition to generic code sections. FIG. 5 is a flowchart 500 illustrating the steps by which compatible code is defined. The method begins at step 501 and proceeds to step 502 where a basic class is defined, as in the above example. At step 504, a generic code section is defined. The generic code section is similar to the code section shown in the above example, which is performed regardless of a target platform. At step 506, a platform-specific code section is defined.

In accordance with an embodiment of the present invention, a platform-specific code section specifies a target language. In accordance with an additional embodiment of the present invention, the platform-specific code section specifies a target platform. One skilled in the relevant arts will appreciate that any identifying information which would necessitate creating different code sections is usable as a distinguishing factor in the definition of a platform-specific code section. Moreover, the information specified, such as a target language or target platform, may be combined such that a code section requires, for example, a specific language and a specific platform in order to be used.

A code section created by the steps of flowchart 500 has the following structure, in accordance with an embodiment of the present invention:

```
<code>
    var t : int = x;
    x = y;
    y = t;
</code>
<code language="java" platform="cldc1.1">
    System.exit(0);
</code>
<code language="cs" platform="netcf2.0">
    Environment.Exit(0);
</code>
```

One skilled in the relevant arts will appreciate that any schema may be used to achieve similar functionality, and the above schema is used only by way of example and not limitation.

In accordance with an embodiment of the present invention, a target platform, such as the target platform defined by mobile device 104, matches more than one platform-specific code section definition. In this situation, the code from all matching code sections is appended and processed as a whole. Moreover, as shown in the above example, generic code sections are usable together with platform-specific code sections. Again, all code that matches the specific platform (generic code is performed regardless of the platform) is appended and processed as a whole.

III. Generating Persistence Logic

Figure 6:
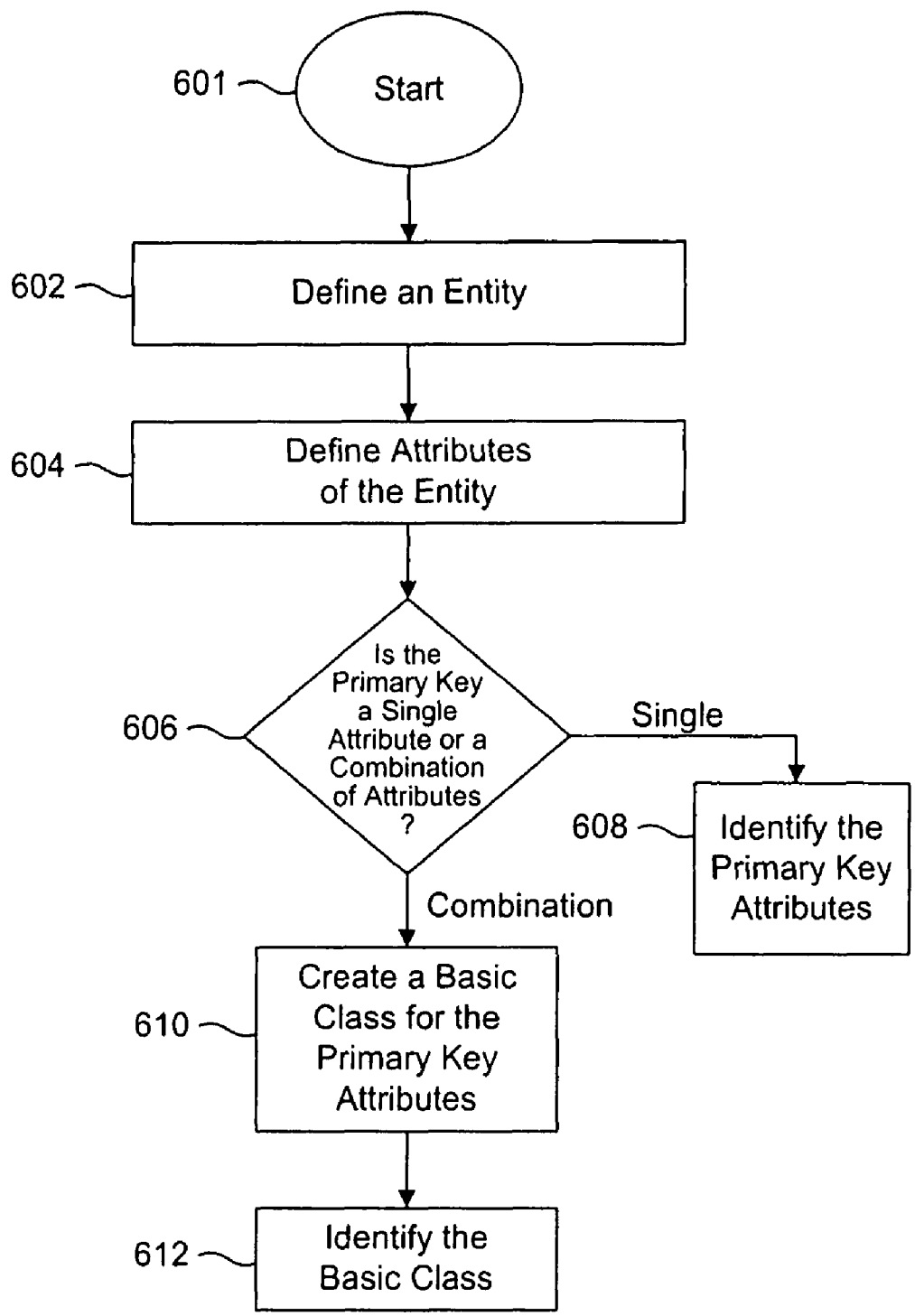
FIG. 6 is a flowchart illustrating steps by which a persistence-capable class is defined, in accordance with an embodiment of the present invention.

Turning back to FIG. 4, step 408 of flowchart 400 processes XML files to generate persistence logic. FIG. 6 is a flowchart 600 illustrating steps by which portable entity classes are defined, in accordance with an embodiment of the present invention. These portable entity classes are then used to generate persistence logic.

The method starts at step 601 and proceeds to step 602 where an entity is defined. An entity is similar to the basic class defined in Section II, but is specifically used to define persistence-capable classes, in accordance with an embodiment of the present invention. Persistence-capable classes are used, for example, with the Hibernate API from Red Hat, Inc., the Java Persistence API, or the Sybase Persistence API. One skilled in the relevant arts will appreciate that persistence-capable classes are adaptable to use with other APIs that provide relevant similar functionality.

At step 604, attributes of the entity are defined. In accordance with an embodiment of the present invention, attributes of an entity are persistent fields. Therefore, in accordance with an embodiment of the present invention, where an entity would map to a table in a database, such as local database 204, the attributes map to columns of the table.

At step 606, a determination is made as to whether a primary key for the entity is defined by a single attribute or by a combination of attributes, in accordance with an embodiment of the present invention. If the primary key is defined by a single attribute, then the primary key attribute is identified at step 608. An example entity where the primary key is defined by a single attribute would be defined as follows, in accordance with an embodiment of the present invention:

```
<entity name="MyEntity" id="myId">
    <attribute name="myId" type="long" />
</entity>
```

Specifically, the "id" field specifies that the attribute named "myId" is the attribute to be used as the primary key. One skilled in the relevant arts will appreciate that any schema may be used to achieve similar functionality, and the above schema is used only by way of example and not limitation.

If, on the other hand, a combination of attributes is used to define the primary key at step 606, then the method proceeds to step 610, where a basic class is created to define the combination of primary key attributes. At step 612, this basic class is identified as the primary key. An example entity where the primary key is defined by a combination of attributes would therefore be defined as follows, in accordance with an embodiment of the present invention:

```
<class name="MyPK">
    <attribute name="id1" type="string" />
    <attribute name="id2" type="short" />
</class>
<entity name="MyEntity" id-class="MyPK">
    <attribute name="id1" type="string" />
    <attribute name="id2" type="short" />
    ...
</entity>
```

Specifically, the attributes "id1" and "id2" combine to make the primary key, so a class "MyPK" is defined by these two attributes. Then, the "id-class" field of the entity is used to identify the class which comprises the primary key attributes. One skilled in the relevant arts will appreciate that any schema may be used to achieve similar functionality, and the above schema is used only by way of example and not limitation.

Figure 7:
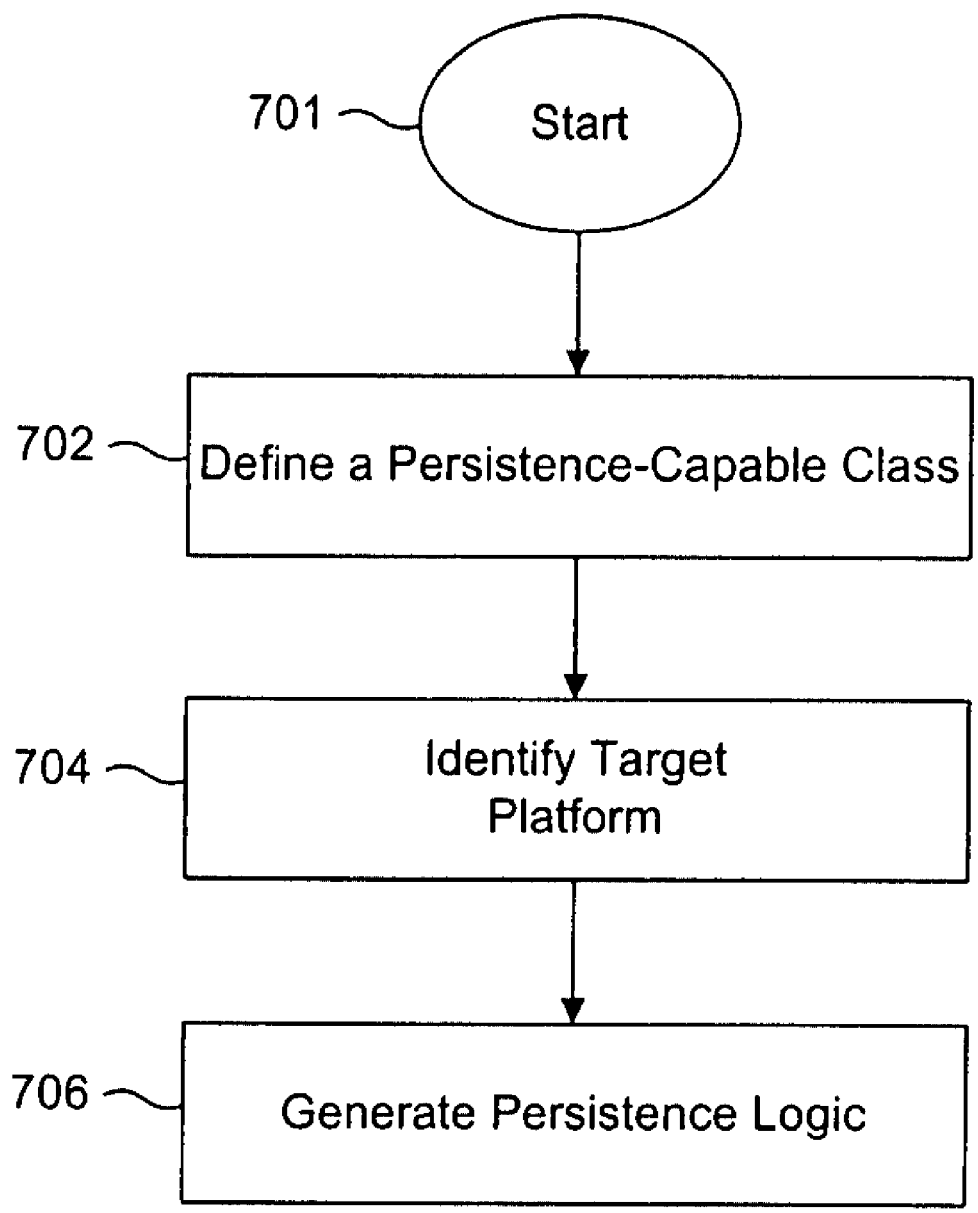
FIG. 7 is a flowchart illustrating steps by which persistence logic is generated, in accordance with an embodiment of the present invention.

With the portable entity classes defined, it is possible to generate the actual persistence logic as in step 408 of flowchart 400. FIG. 7 is a flowchart 700 illustrating steps by which the persistence logic is generated from the portable entity classes, in accordance with an embodiment of the present invention.

The method begins at step 701 and proceed to step 702 where a persistence-capable class is defined. A persistence-capable class is, for example, the portable entity classes disclosed above, but one skilled in the relevant arts will appreciate that any functionally similar schema may be used. At step 704, a target platform is identified, in accordance with an embodiment of the present invention. The target platform is, for example, the platform associated with mobile device 104 and local database 204.

In accordance with an embodiment of the present invention, the target platform for a persistence-capable class is defined by a target language, such as Java or C#. In accordance with an additional embodiment of the present invention, the target platform for a persistence-capable class is defined by a persistence framework, such as Hibernate, NHibernate, or Java Persistence API. At step 706, persistence logic consistent with the target platform is generated based on the persistence-capable class.

IV. Defining Service Classes

A service class is an extension of the basic class defined in Section II. Service classes can be used to support business operation replay for the purposes of synchronizing databases, such as local database 204 and central database 202. Business operation replay allows a service class to perform a set of operations against local database 204, and, rather than uploading a copy of the results to central database 202, instead captures the operations themselves and replays them against central database 202.

Figure 8:
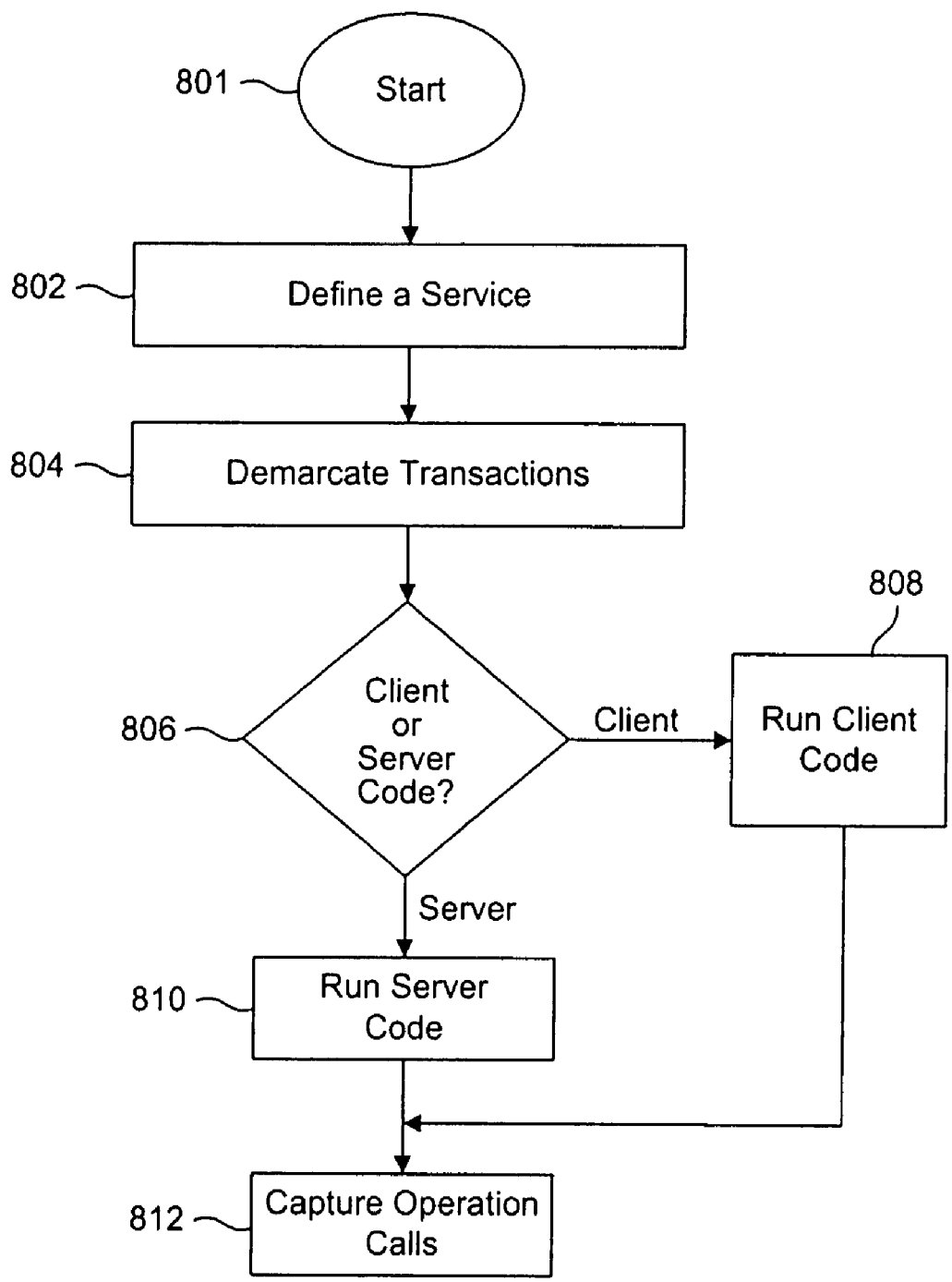
FIG. 8 is a flowchart illustrating steps by which a service class is defined to support different business logic on a client/server basis, in accordance with an embodiment of the present invention.

FIG. 8 is a flowchart 800 illustrating steps by which a service class is created. The method begins at step 801 and proceeds to step 802, where a service is defined. In accordance with an embodiment of the present invention, <service> tags are provided for the definition of a service class, with statements available to a basic class also being available to a service class (e.g., operation, code, attribute, etc.). At step 804, transactions are demarcated. Transactions are, in the context of business operations, the set of operations (typically code) which will be performed against the local database 204 and replayed against the central database 202. An example service would be defined as follows, in accordance with an embodiment of the present invention:

```
<service name="MyService">
   <operation name="changeAddress">
      <parameter name="updatedCustomer" type="Customer" />
      <code>
         begin transaction;
         try
         {
            var customer : Customer =
Customer.find(updatedCustomer.getId( ));
            customer.setAddress(updatedCustomer.getAddress( ));
            commit transaction;
         }
         catch (Exception ex)
         {
            rollback transaction;
         }
      </code>
```

-continued

```
   </operation>
</service>
```

In the above example, the transaction begins at the start of the <code> block, and is committed (i.e., played against the local database 204 and replayed against central database 202) within a "try" block. In the event of an exception, the transaction is rolled-back, and is accordingly not played against either database. One skilled in the relevant arts will appreciate that any schema may be used to achieve similar functionality, and the above schema is used only by way of example and not limitation.

In accordance with an embodiment of the present invention, services (as with any basic class definition) may be either stateless or stateful. When using explicit transaction demarcation with stateful services, transactions can be initiated by one operation and committed by another.

In accordance with an additional embodiment of the present invention, transactions need not be explicitly demarcated, and can be demarcated through the use of declarative transaction demarcation. A <transaction> tag is defined, in an embodiment, as a shorthand for defining an operation that begins a transaction, commits the transaction if no exceptions are thrown, and rolls back the transaction if an exception is thrown.

At step 812, the performed code blocks are captured for replay against a central database, such as central database 202. Flowchart 800 illustrates additional steps common to an embodiment of the present invention whereby code generated from the XML file may be executed on either a client, such as mobile device 104, or a server, such as server system 102. At step 806, a determination is made as to whether the present platform is a client platform or server platform. If the platform is a client platform, then code marked as client code is generated at step 808; likewise, for a server platform, code marked as server code is generated at step 810. In either case, only the code specific to the identified platform is captured at step 812. An example service defining operations for client and server platforms would be defined as follows, in accordance with an embodiment of the present invention:

```
<service name="MyService">
   <transaction name="changeAddress">
      <parameter name="updatedCustomer" type="Customer" />
      <code ifclient="true">
         var customer : Customer =
Customer.find(updatedCustomer.getId( ));
         customer.setAddress(updatedCustomer.getAddress( ));
      </code>
      <code ifserver="true">
         // make web service call to external system to update address
      </code>
   </transaction>
</service>
```

In the above example, the first code section is executed if the code is generated for a client platform, whereas the second code section is executed if the code is generated for a server platform. At step 812, only the code for the corresponding platform is captured. One skilled in the relevant arts will appreciate that any schema may be used to achieve similar functionality, and the above schema is used only by way of example and not limitation.

Additionally, transactions allow for the capture of operation calls and their parameter values on a client-side transaction, in accordance with an embodiment of the present invention. An example service defining operation calls and parameter values would be defined as follows, in accordance with an embodiment of the present invention:

```
<service name="BankService">
    <transaction name="deposit">
        <parameter name="accountId" type="int" />
        <parameter name="amount" type="decimal" />
        <code>
            var account : Account = Account.find(accountId);
            account.setBalance(account.getBalance( ).add(amount));
        </code>
    </transaction>
</service>
```

All tags located between the <transaction> tags, including the parameters, would be included within the transaction for replay. One skilled in the relevant arts will appreciate that any schema may be used to achieve similar functionality, and the above schema is used only by way of example and not limitation.

Figure 9:
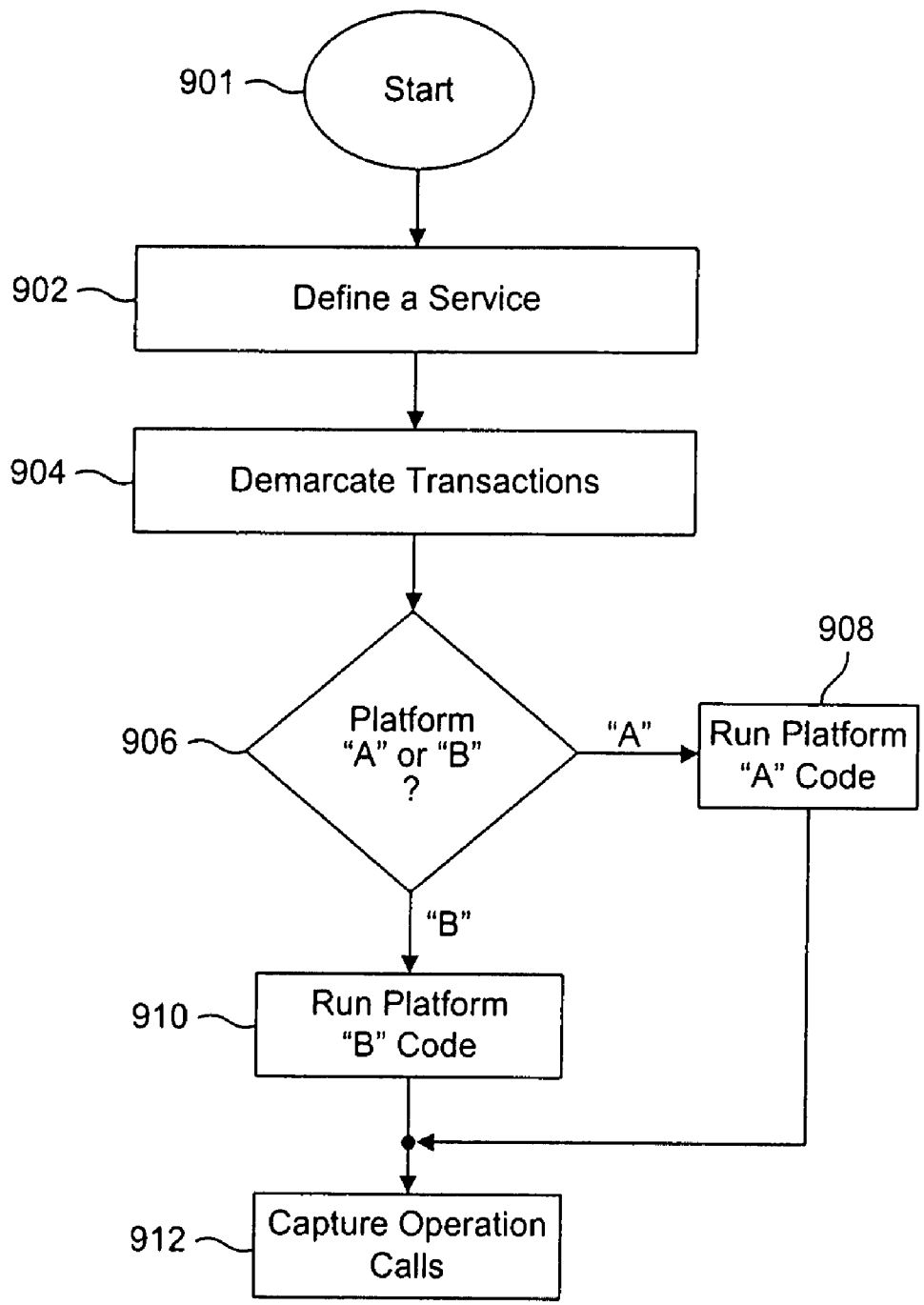
FIG. 9 is a flowchart illustrating steps by which a service class is defined to support different business logic for multiple target platforms, in accordance with an embodiment of the present invention.

FIG. 9 is a flowchart 900 illustrating alternate steps for defining a service class, in accordance with an embodiment of the present invention. As with flowchart 800, detailed above, the method starts at step 901 and proceeds to step 902 where a service is defined, and to step 904 where transactions are demarcated. At step 906, the method determines whether to generate code from code blocks targeted to a platform "A" or a platform "B", in accordance with an embodiment of the present invention. At step 908, code for platform "A" is generated if a target platform, such as a platform defined by mobile device 104, is determined to correspond to platform "A". Alternatively, code for platform "B" is generated if platform "B" corresponds to the target platform. One skilled in the relevant arts will appreciate that multiple target platforms may be defined. At step 912, operation calls are captured, the operation calls corresponding to the code selected for the target platform. Determining whether to capture code for a particular platform is determined, in accordance with an embodiment of the present invention, by defining code sections with specific platform targets, as shown in Section II.

Figure 10:
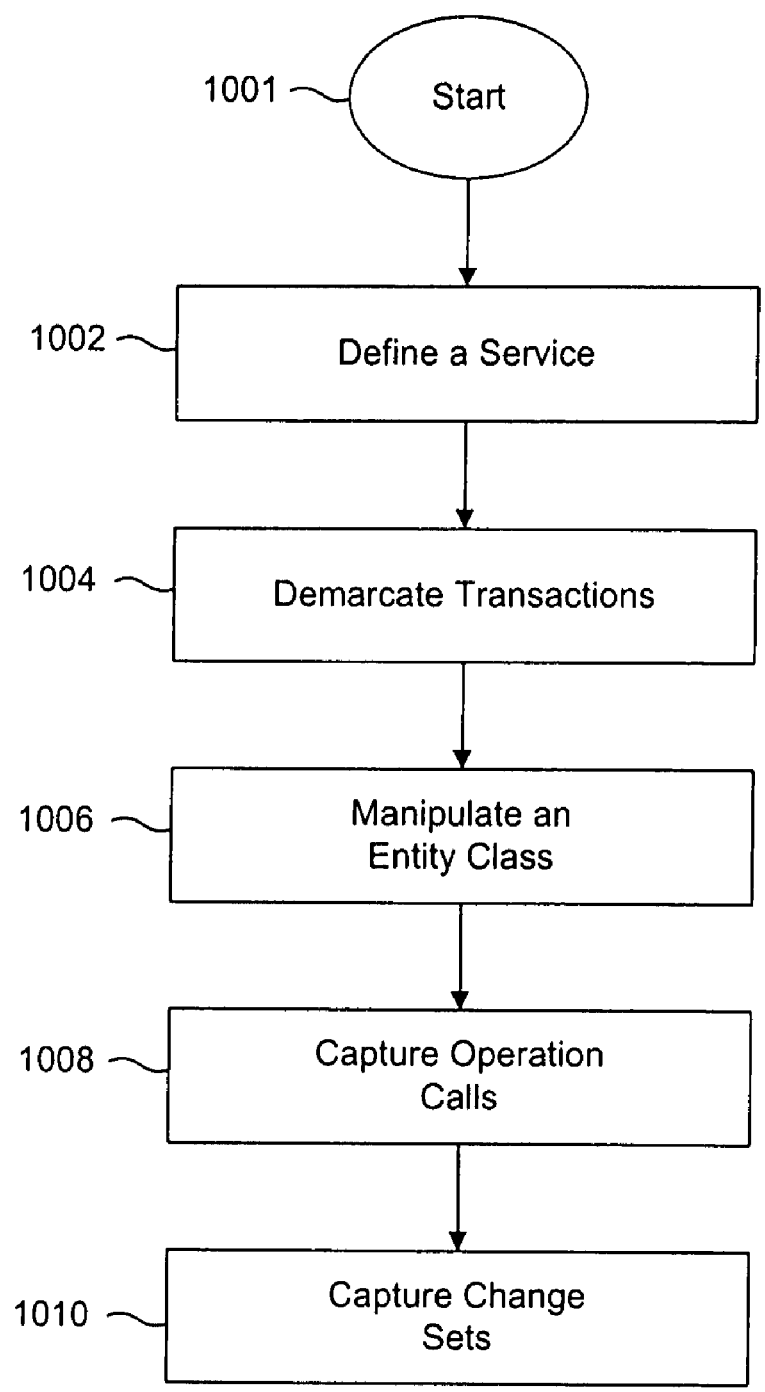
FIG. 10 is a flowchart illustrating steps by which a local database and server database are kept in synchronization, in accordance with an embodiment of the present invention.

FIG. 10 is a flowchart 1000 illustrating additional steps for defining a service class, in accordance with an embodiment of the present invention. As with flowcharts 800 and 900, detailed above, the method starts at step 1001 and proceeds to step 1002 where a service is defined, and to step 1004 where transactions are demarcated. At step 1006, an entity class is manipulated in some manner. In accordance with an embodiment of the present invention, a query is triggered on the entity class, causing some change to a database, such as local database 204. As before, at step 1008, operation calls are captured for playback against a central database 202.

Additionally, flowchart 1000 has step 1010, where change sets are captured. Change sets indicate that an entity (e.g., a table in a database) has been modified. In all cases shown in flowcharts 800, 900, and 1000, operation calls are transmitted to a central database 202 and replayed against the database to effectuate the change caused by the operation calls. However, it is possible that even by replaying operation calls, conflicts arise in the central database 202, such as, for example, when an operation is dependent on another data row which has been modified at the server or by a different client. In accordance with an embodiment of the present invention, the conflict results in fewer data rows in central database 202 being modified than were modified in local database 204.

When at least rows modified at local database 204 are also modified in central database 202, even if a conflict arose, synchronization between local database 204 and central database 202 is maintained, as all of the changed rows will be updated at local database 204. However, if fewer rows are modified in central database 202 than were modified at local database 204, then synchronization may not be maintained, as there are now rows that have been modified at the local database 204 with changes that have not been reflected in the central database 202.

In order to maintain synchronization in this situation, change sets are used to capture a listing of all rows changed in local database 204, in accordance with an embodiment of the present invention. In the event that fewer rows are modified in central database 202 responsive to changes in local database 204, then the remaining rows of central database 202, as reflected in the change set, are issued a "harmless update," in accordance with an embodiment of the present invention. A "harmless update" is any update to the row which will trigger synchronization of the row with local database 204 without altering critical data contents, such as by, for example, updating a modification date field. One skilled in the relevant arts will appreciate that a number of means for issuing a "harmless update" exist, and the use of a date field is used as an example, and not by way of limitation.

In accordance with an embodiment of the present invention, change sets capture row insertions, deletions, and updates in the local database, but may be operable to capture additional changes to the local database 204. One skilled in the relevant arts will appreciate that the result of this process is to ensure that the local database 204 remains synchronized with central database 202 even when a conflict arises, but that particular implementations may utilize change sets to resolve conflicts in order to guarantee data accuracy, not just synchronization.

The alternate steps illustrated in flowcharts 800, 900, and 1000 can be combined or used separately. In accordance with an embodiment of the present invention, a service class is defined that captures change sets, specifies a target environment for code sections, and restricts the execution location for business operations on a client/server basis.

V. Defining Presentation Classes

Figure 11:
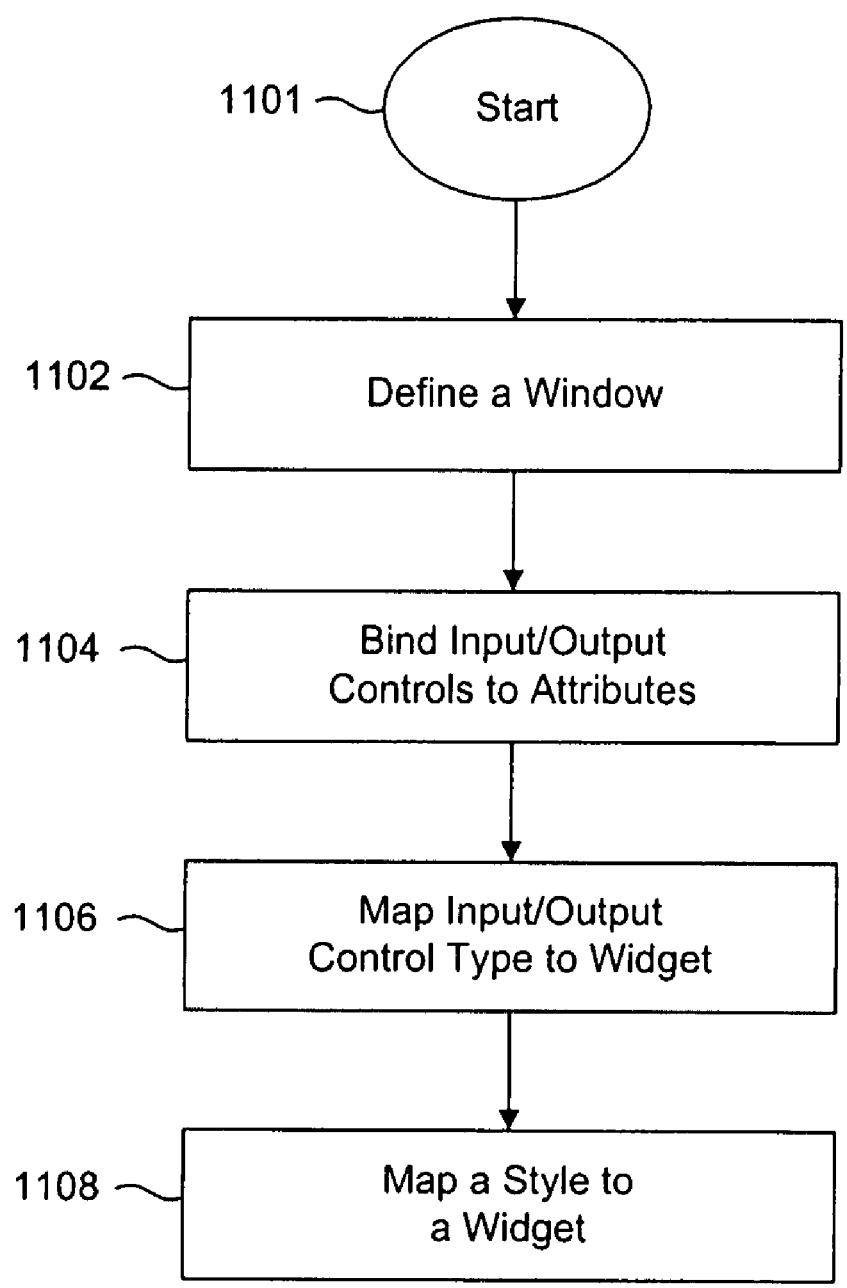
FIG. 11 is a flowchart illustrating steps by which a window class is defined to support presentation logic, in accordance with an embodiment of the present invention.

FIG. 11 is a flowchart 1100 illustrating steps by which a presentation class is defined, in accordance with an embodiment of the present invention. Step 410 of flowchart 400 in FIG. 4 generates presentation logic through the execution of a code generator on XML data from presentation classes, in accordance with an embodiment of the present invention.

The method begins at step 1101 and proceeds to step 1102, where a window is defined. A window is a presentation class derived from the base class discussed in Section II. Windows may define several controls, each control corresponding to some behavior of the window. For example, a window with a text and icon label would be defined as follows, in accordance with an embodiment of the present invention:

```
<window name="CustomerSearch" title="Customer Search">
    <label icon="images/customer.ico" text="Customer Name:" />
</window>
```

One skilled in the relevant arts will appreciate that any schema may be used to achieve similar functionality, and the above schema is used only by way of example and not limitation.

Additional controls are specified for the purposes of providing inputs and outputs in the window. In accordance with an embodiment of the present invention, a window with an input control would be defined as in the following example:

```
<window name="CustomerSearch" title="Customer Search">
    <label text="Customer Name:" />
    <input name="customerName" />
</window>
```

Similarly, a window with an output control would be defined as in the following example, in accordance with an embodiment of the present invention:

```
<window name="CustomerInfo" title="Customer Info">
    <label text="Customer Name:" />
    <output name="customerName" />
</window>
```

One skilled in the relevant arts will appreciate that any schema may be used to achieve similar functionality, and the above schema is used only by way of example and not limitation.

At step 1104, the aforementioned input and output controls are bound to attributes of the window. In accordance with an embodiment of the present invention, an input or output control with a particular name performs automatic data binding to an attribute with the same name. If the attribute has not been explicitly defined, it is then implicitly defined with a default data type (e.g., "string"). In accordance with an additional embodiment of the present invention, if the data type of an input or output control is not of the default data type, then an attribute must be explicitly defined.

At step 1106, an input or output control type is mapped to a widget. A control definition allows a standard control type to be mapped to a platform-specific widget. This allows for the mapping of input and output types to user interface widgets to be extensible. In accordance with an embodiment of the present invention, a control definition would be defined as follows:

```
<control type="input.boolean.checkbox">
    <code>
        final javax.swing.JCheckBox $$ = new javax.swing.JCheckBox(${__label__});
        $$.setSelected(${getAttribute});
        $$.addItemListener
        (
            new java.awt.event.ItemListener( )
            {
                public void itemStateChanged(java.awt.event.ItemEvent event)
                {
                    ${setAttribute}(event.getStateChange( ) == java.awt.event.ItemEvent.SELECTED);
                }
            }
        );
    </code>
</control>
```

One skilled in the relevant arts will appreciate that any schema may be used to achieve similar functionality, and the above schema is used only by way of example and not limitation.

At step 1108, a style is mapped to a widget. A style definition defines code generation for a named style that is referenced by a window class, or by a window control such as one of the aforementioned input controls, in accordance with an embodiment of the present invention. For example, style definition is defined as follows, in accordance with an embodiment of the present invention:

```
<style name="FancyBorder">
    <code platform="swing">
        $$.setBorder(javax.swing.BorderFactory.createLineBorder
                    (java.awt.Color.PINK));
    </code>
    <code platform="netcf">
        ...
    </code>
</style>
```

It should be noted that, as with any code section, it is possible to configure alternate code fragments for different platforms, as discussed in Section II, in accordance with an embodiment of the present invention. One skilled in the relevant arts will appreciate that any schema may be used to achieve similar functionality, and the above schema is used only by way of example and not limitation.

VI. Example Computer System Implementation

Figure 12:
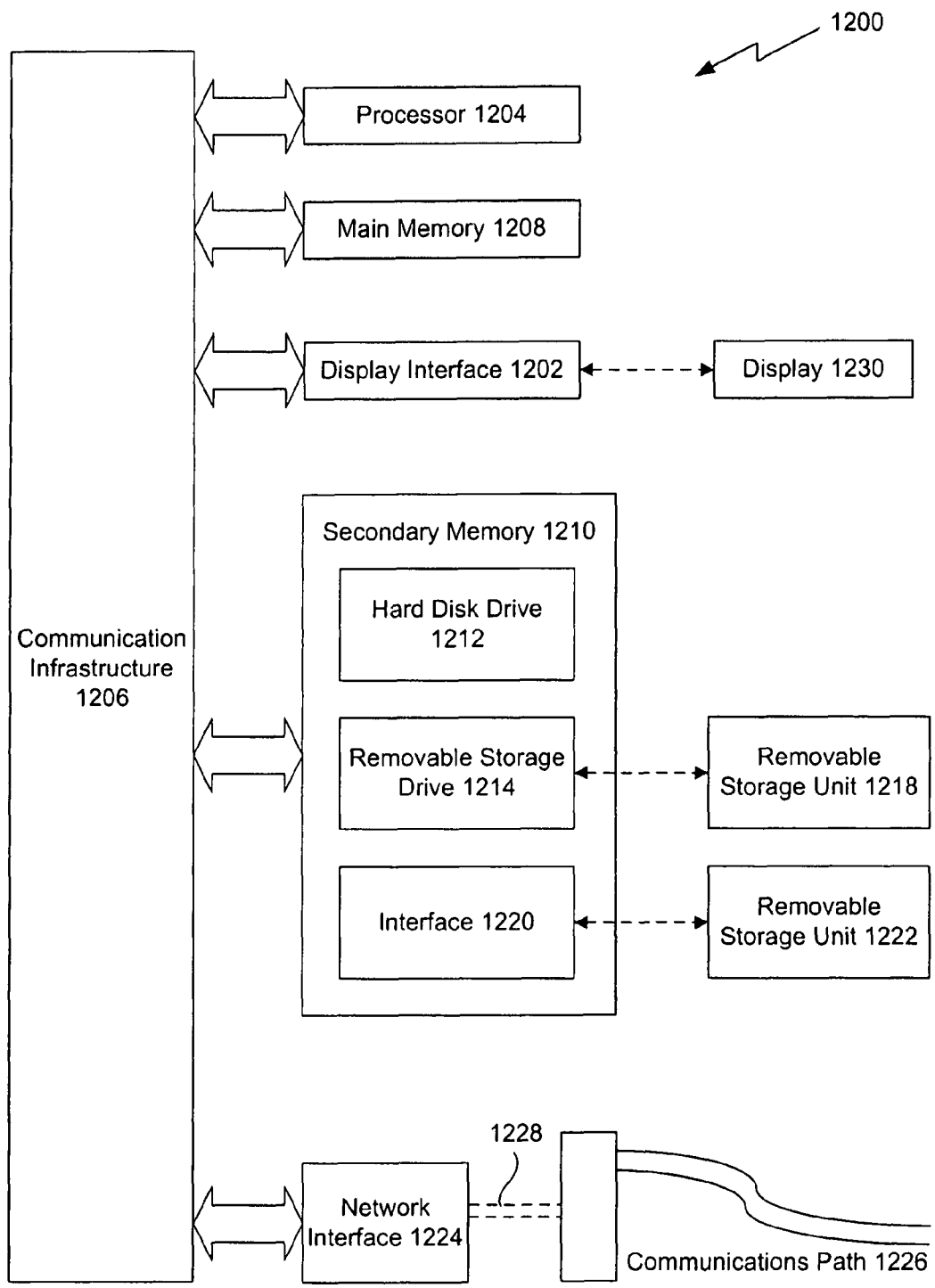
FIG. 12 depicts an example computer system in which the present invention may be implemented.

Various aspects of the present invention can be implemented by software, firmware, hardware, or a combination thereof. FIG. 12 illustrates an example computer system 1200 in which the present invention, or portions thereof, can be implemented as computer-readable code. For example, the methods illustrated by flowcharts 400 of FIG. 4, 500 of FIG. 5, 600 of FIG. 6, 700 of FIG. 7, 800 of FIG. 8, 900 of FIG. 9, 1000 of FIG. 10, and 1100 of FIG. 11 can be implemented in system 1200. Various embodiments of the invention are described in terms of this example computer system 1200. After reading this description, it will become apparent to a person skilled in the relevant art how to implement the invention using other computer systems and/or computer architectures.

Computer system 1200 includes one or more processors, such as processor 1204. Processor 1204 can be a special purpose or a general purpose processor. Processor 1204 is connected to a communication infrastructure 1206 (for example, a bus or network).

Computer system 1200 also includes a main memory 1208, preferably random access memory (RAM), and may also include a secondary memory 1210. Secondary memory 1210 may include, for example, a hard disk drive 1212, a removable storage drive 1214, and/or a memory stick. Removable storage drive 1214 may comprise a floppy disk drive, a magnetic tape drive, an optical disk drive, a flash memory, or the like. The removable storage drive 1214 reads from and/or writes to a removable storage unit 1218 in a well known manner. Removable storage unit 1218 may comprise a floppy disk, magnetic tape, optical disk, etc. which is read by and written to by removable storage drive 1214. As will be appreciated by persons skilled in the relevant art(s), removable storage unit 1218 includes a computer usable storage medium having stored therein computer software and/or data.

In alternative implementations, secondary memory 1210 may include other similar means for allowing computer programs or other instructions to be loaded into computer system 1200. Such means may include, for example, a removable storage unit 1222 and an interface 1220. Examples of such means may include a program cartridge and cartridge interface (such as that found in video game devices), a removable memory chip (such as an EPROM, or PROM) and associated socket, and other removable storage units 1222 and interfaces 1220 which allow software and data to be transferred from the removable storage unit 1222 to computer system 1200.

Computer system 1200 may also include a communications interface 1224. Communications interface 1224 allows software and data to be transferred between computer system 1200 and external devices. Communications interface 1224 may include a modem, a network interface (such as an Ethernet card), a communications port, a PCMCIA slot and card, or the like. Software and data transferred via communications interface 1224 are in the form of signals which may be electronic, electromagnetic, optical, or other signals capable of being received by communications interface 1224. These signals are provided to communications interface 1224 via a communications path 1226. Communications path 1226 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1218, removable storage unit 1222, and a hard disk installed in hard disk drive 1212. Signals carried over communications path 1226 can also embody the logic described herein. Computer program medium and computer usable medium can also refer to memories, such as main memory 1208 and secondary memory 1210, which can be memory semiconductors (e.g. DRAMs, etc.). These computer program products are means for providing software to computer system 1200.

Computer programs (also called computer control logic) are stored in main memory 1208 and/or secondary memory 1210. Computer programs may also be received via communications interface 1224. Such computer programs, when executed, enable computer system 1200 to implement the present invention as discussed herein. In particular, the computer programs, when executed, enable processor 1204 to implement the processes of the present invention, such as the steps in the methods illustrated by flowcharts 400 of FIG. 4, 500 of FIG. 5, 600 of FIG. 6, 700 of FIG. 7, 800 of FIG. 8, 900 of FIG. 9, 1000 of FIG. 10, and 1100 of FIG. 11 discussed above. Accordingly, such computer programs represent controllers of the computer system 1200. Where the invention is implemented using software, the software may be stored in a computer program product and loaded into computer system 1200 using removable storage drive 1214, interface 1220, hard drive 1212 or communications interface 1224.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

VII. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for synchronizing a local database with a remote database, the method comprising:

replaying captured operation calls, having been previously played against the local database by a transaction from a service class, against the remote database;

receiving, at the remote database, change sets of the transaction representing changes made to the local database by the processing of the transaction;

comparing, in a processor, changes to the remote database, made by having replayed the captured operation calls, against the change sets; and issuing a harmless update to a non-critical field of one or more items in the remote database corresponding to each change present in the change sets which was not also a change to the remote database made by replaying the captured operation calls, in order to trigger synchronization.

2. The method of claim 1, further comprising:

sending the one or more items to the local database responsive to a synchronization request resulting from the harmless update; and updating the local database consistent with the changes to the one or more items, such that the one or more items are synchronized between the local database and the remote database.

3. The method of claim 2, wherein updating the local database comprises:

reverting the changes made to the local database by the captured operation calls in favor of the one or more items from the remote database.

4. The method of claim 1, wherein issuing the harmless update comprises:

updating a modification date field corresponding to the one or more items.

5. The method of claim 1, wherein the one or more items in the remote database are rows of one or more tables.

6. A computer-readable medium having instructions stored thereon that, if executed by a computing device, cause the computing device to perform a method comprising:

replaying captured operation calls, having been previously played against the local database by a transaction from a service class, against the remote database;

receiving, at the remote database, change sets of the transaction representing changes made to the local database by the processing of the transaction;

comparing changes to the remote database, made by having replayed the captured operation calls, against the change sets; and issuing a harmless update to a non-critical field of one or more items in the remote database corresponding to each change present in the change sets which was not also a change to the remote database made by replaying the captured operation calls, in order to trigger synchronization.

7. A system capable of synchronizing a local database with a remote database, comprising:

a memory configured to store:

a replaying module configured to replay captured operation calls, having been previously played against the local database by a transaction from a service class, against the remote database;

a receiving module configured to receive, at the remote database, change sets of the transaction representing changes made to the local database by the processing of the transaction;

a comparing module configured to compare changes to the remote database, made by having replayed the captured operation calls, against the change sets; and issuing a harmless update to a non-critical field of one or more items in the remote database corresponding to each change present in the change sets which was not also a change to the remote database made by replaying the captured operation calls, in order to trigger synchronization; and one or more processors configured to process the modules.

* * * * *